(No Model.) 2 Sheets—Sheet 1.

G. E. LEWIS.
LAWN MOWER.

No. 263,344. Patented Aug. 29, 1882.

Attest:
H. H. Schott
N. R. Brown

Inventor:
George E. Lewis,
per C. H. Watson (No Model.) 2 Sheets—Sheet 2.

G. E. LEWIS.
LAWN MOWER.

No. 263,344. Patented Aug. 29, 1882.

Attest:
H. H. Schott.
A. R. Brown.

Inventor:
George E. Lewis
C. H. Watson & Co.
atty

United States Patent Office.

GEORGE E. LEWIS, OF SENECA FALLS, NEW YORK.

LAWN-MOWER.

SPECIFICATION forming part of Letters Patent No. 263,344, dated August 29, 1882.

Application filed October 15, 1881. (No model.)

*To all whom it may concern:*

Be it known that I, GEORGE E. LEWIS, a citizen of the United States of America, residing at Seneca Falls, in the county of Seneca and State of New York, have invented certain new and useful Improvements in Lawn-Mowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in that class of lawn-mowers in which the spiral cutters or knives composing the revolving cutter-bar are journaled or supported in the forward end of the mower-frame and adapted to be driven by a single train of gearing from the main drive-wheel.

The object of my invention is to simplify the construction of lawn-mowers, and thus render them more efficient in operation; and the invention consists in the construction and arrangement of parts, as hereinafter more fully described and claimed.

Figure 1:
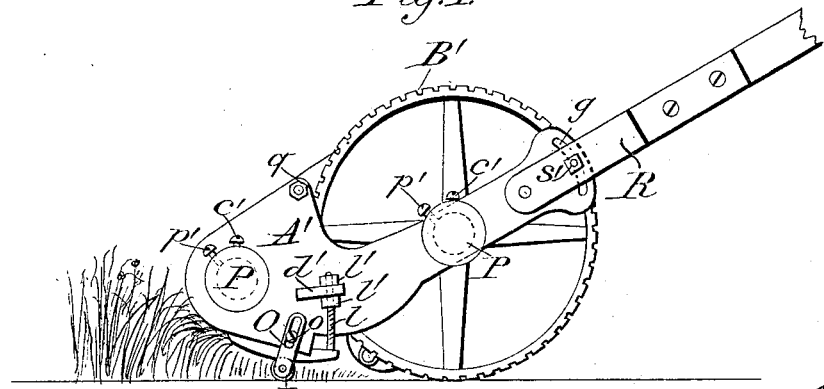
Figure 2:
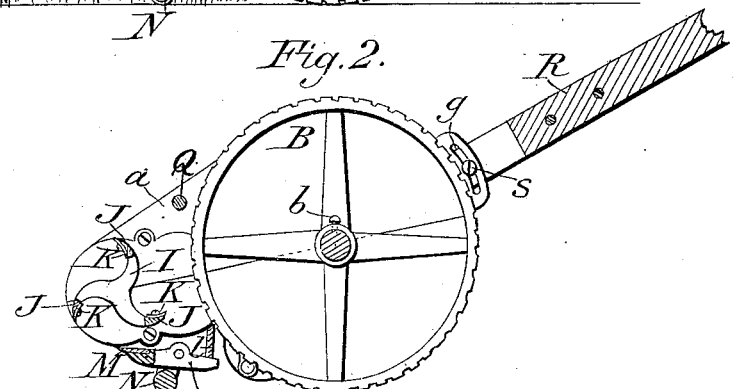
Figure 3:
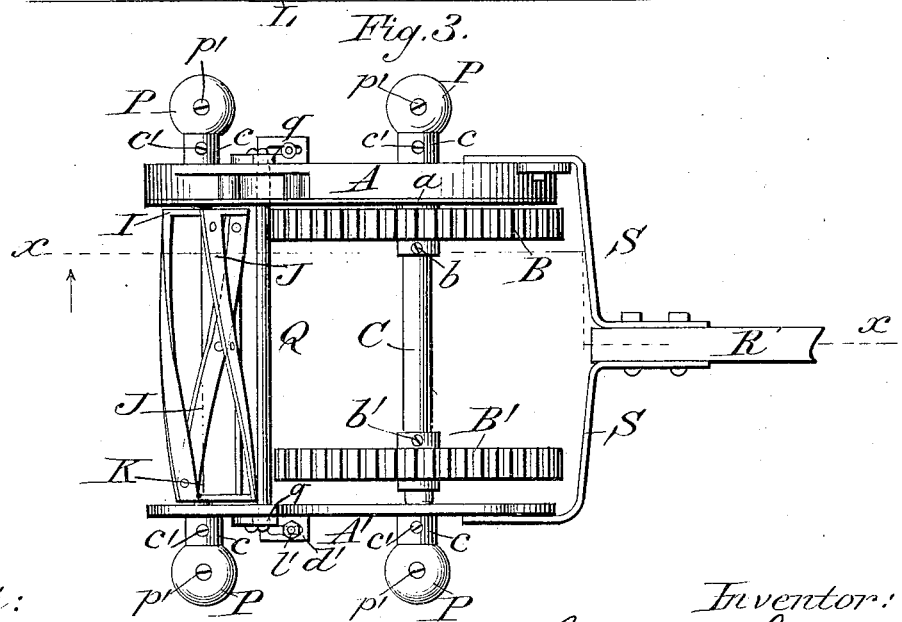
Figure 4:
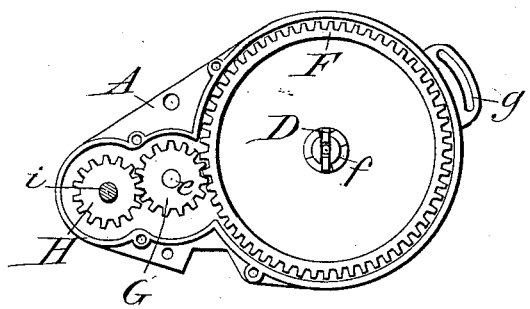
Figure 5:
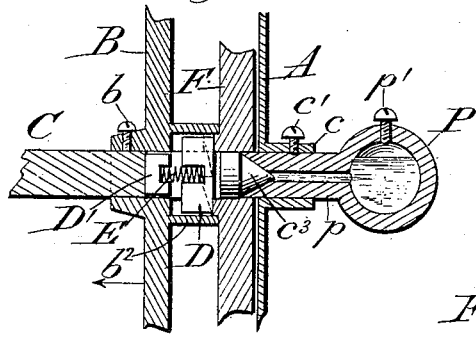
Figure 6:
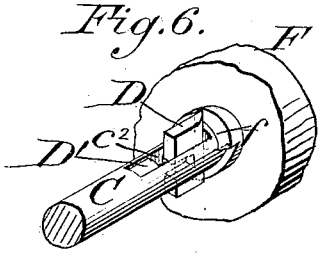
Figure 8:
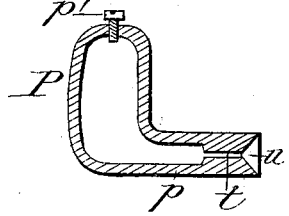
Figure 7:
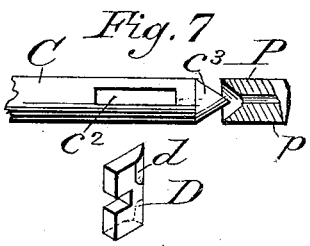

In the annexed drawings, which fully illustrate my invention, Figure 1 is a side elevation of my improved lawn-mower. Fig. 2 is a vertical longitudinal section on the line $x\ x$ of Fig. 3. Fig. 3 is a plan view. Fig. 4 is a view of the train of gearing by means of which the revolving cutter-bar is driven. Fig. 5 is a vertical transverse section through the main drive-wheel and large gear, with a longitudinal section through the axle and an oil-reservoir. Figs. 6 and 7 are detail views, showing clutch mechanism and manner of oiling axle; and Fig. 8 represents a modification in the form of the oil-reservoir.

Like letters indicate like parts in the several views.

The frame of the machine consists of side pieces or plates, A A', which are suitably connected, the plate A being flanged and arranged to form an inclosing box for the gearing that drives the revolving knives or cutter-bar. The supporting-wheels B B' are secured to the axle C, and are provided with hubs, through which are passed the screws $b\ b'$, by which they are preferably attached to said axle. A longitudinal slot, $c^2$, is formed in one end of the axle, near the main drive-wheel B, and this slot receives the pawl D and recessed block D', which are separated by a spring, E, the whole forming a clutch mechanism adapted to cause the pawl or bar D to engage, by the pressure of the spring E, with a ratchet, $f$, which is attached to and forms the hub of the main drive-gear F. This gear F is journaled loosely on the end of the axle C, and is inclosed in the flanged box or case A, which is provided on its inner side with a sectional cover, $a$, secured by screws or bolts, said cover thus serving to exclude dust and dirt from the box, and being arranged so as to be capable of ready removal when required. Within the case A, and arranged in front of the main gear F, so as to mesh therewith, is a gear or pinion, G, which is loosely journaled on a stud, $e$, and engages with a gear, H, on one of the journals $i$ of the revolving cutter bar or frame I. The revolving cutter bar or frame consists of the radial arms I, which are journaled on each side in the forward ends of the plates A A', and are connected by the spiral wings J, each of which carries a knife or cutter, K, secured thereto in any suitable manner. It will be seen that as the frame of the mower is drawn or pushed forward the forward revolution of the driving or supporting wheels will cause the axle C to revolve likewise. The pawl D, attached to the axle, being held by the pressure of the spring E against the teeth of the ratchet $f$ on the main gear F, will cause the latter to revolve in a forward direction, and, by reason of its engagement with the loose pinion G, impart a reverse movement to the gear H, which thus revolves the cutter-frame I in a forward and downward direction. The recessed block D', which is inserted in the slotted axle C, serves as a bearing for one end of the spring E, the opposite end of which is seated in the recess formed in the pawl D, the spring serving to hold the pawl in contact with the ratchet-hub $f$. The pawl D is oppositely beveled at its upper and lower ends, respectively, as shown at $d$, so that when the mower is drawn back these bevels $d$ will slip readily over the teeth of the ratchet $f$ without engaging therewith, and thus, as the train of gearing remains stationary, the cutter-frame I will not be revolved during the backward movement of the mower.

The drive-wheel B is provided on its outer side with an enlarged hollow hub or cavity, $b^2$, which incloses the clutch mechanism and prevents it from becoming clogged or injured by contact with dust, dirt, or cut grass.

On the outer sides of the plates A A' are sleeves or collars $c$ $c$, which receive the stems of the oil-reservoirs P, said reservoirs or cups being held in place by means of the set-screws $c'$ $c'$, so as to be readily detached when desired. The detachable reservoirs P are preferably ball shaped or globular in form, but may be made vertically elongated, as shown in Fig. 8. They are provided with horizontal stems $p$, which may be of uniform bore throughout, or may be contracted at their outer ends, as shown at $t$, Fig. 8, to retard somewhat the flow of oil to the axle-bearings. Each reservoir is provided at the top with an opening through which the oil is introduced, and which opening may be closed by means of a screw, $p'$, or other suitable means. The stems $p$ of the oil-cups P are beveled or provided with flaring mouths $u$, in which fit the conical ends $c^3$ of the axle C. It will be seen that as the mechanism is operated a ready means is thus provided for its self-lubrication without any trouble to the operator except to see that the oil-cups P are properly supplied.

Near the forward ends of the plates or side pieces, A A', on each side, are slotted or perforated lugs $d'$, by means of which the stationary or horizontal cutter-bar L is attached to the frame. This cutter-bar carries a suitable knife or cutter, M, and is provided at each end, which is bent twice at right angles, with threaded uprights or studs $l$, which pass through the slotted lugs $d'$, and are secured therein by means of nuts $l'$ $l'$, arranged on the threaded stud above and below the lug $d'$. By this construction the cutter-bar L may be raised or lowered or inclined in any necessary position by simply loosening the nuts $l'$ and adjusting the studs $l$ as required.

A roller, N, is arranged in a convenient position beneath the cutter-bar L, and is provided with elbow-bearings O, the vertical arms of which are slotted for the passage of set-screws $o$ $o$ by means of which said bearings are adjustably attached to the mower-frame.

The bearings or journals of the revolving cutter-frame I are provided with self-lubricating cups P, similar to those above described, and which are also secured in the same manner by means of collars $c$ and screws $c'$.

The upper forward portions of the side pieces, A A', are connected by a brace or cross-bar, Q, the threaded ends of which are secured in said side pieces by means of nuts $q$ $q$.

The mower is provided with a handle, R, which is connected with the frame A A' by diverging arms S S, which are securely bolted at one end to the handle, forming a socket therefor, and are pivoted at their opposite ends to the side pieces of the mower-frame. At the rear ends of the side pieces, A A', are slots $g$ $g$, through which pass bolts $s$ $s$, having nuts $s'$, by which the arms S are also connected with the frame, so as to render the handle R capable of adjustment to any desired angle as may be found necessary.

Having thus described my invention, what I claim as new, and desire to secure by Letters Patent, is—

1. In a lawn-mower, the combination, with the side pieces, A A', having collars $c$ $c$, axle C, having conical ends, and cutter-frame I, of the detachable oil-cups P, provided with horizontal stems $p$, having flaring mouths $u$, substantially as shown and described.

2. In a lawn-mower, the combination, with the side pieces, A A', slotted axle C, and gear F, having ratchet-toothed hub $f$, of the pawl D and recessed block D', arranged in the slot $c^2$ of the axle, and the spiral spring E, placed between the recessed block and pawl, said pawl being oppositely beveled, as at $d$ $d$, and adapted to engage with the adjoining ratchet-hub, substantially as and for the purpose described.

In testimony whereof I affix my signature in presence of two witnesses.

GEORGE E. LEWIS.

Witnesses:
SAML. T. REYNOLDS,
GEO. B. LEWIS.